United States Patent
Jung et al.

(10) Patent No.: US 11,773,260 B2
(45) Date of Patent: Oct. 3, 2023

(54) THERMOPLASTIC RESIN COMPOSITION AND MOLDED PRODUCT PRODUCED USING THE SAME AND HAVING IMPROVED PLATING ADHESION AND LIGHT TRANSMITTANCE

(71) Applicants: HYUNDAI MOTOR COMPANY, Seoul (KR); KIA CORPORATION, Seoul (KR); LOTTE CHEMICAL CORPORATION, Seoul (KR)

(72) Inventors: Woo Chul Jung, Bucheon-si (KR); Jun Ho Song, Hwaseong-si (KR); Choon Soo Lee, Seoul (KR); Choon Ho Lee, Hwaseong-si (KR); Kyoung Ju Kim, Uiwang-si (KR); Young Seung Kim, Uiwang-si (KR); Young Hyo Kim, Uiwang-si (KR); Hyun Uk Jeon, Uiwang-si (KR)

(73) Assignees: Hyundai Motor Company, Seoul (KR); Kia Corporation, Seoul (KR); Lotte Chemical Corporation, Seoul (KR)

( * ) Notice: Subject to any disclaimer, the term of this patent is extended or adjusted under 35 U.S.C. 154(b) by 100 days.

(21) Appl. No.: 17/505,278

(22) Filed: Oct. 19, 2021

(65) Prior Publication Data

US 2022/0135794 A1    May 5, 2022

(30) Foreign Application Priority Data

Oct. 29, 2020 (KR) .................. 10-2020-0141650

(51) Int. Cl.
    *C08L 69/00* (2006.01)
(52) U.S. Cl.
    CPC ........... *C08L 69/00* (2013.01); *C08L 2201/08* (2013.01); *C08L 2205/03* (2013.01)

(58) Field of Classification Search
CPC ... C08L 69/00; C08L 2201/08; C08L 2205/03
See application file for complete search history.

(56) References Cited

U.S. PATENT DOCUMENTS

| | | | | |
|---|---|---|---|---|
| 5,296,538 A | * | 3/1994 | Orikasa | C08L 55/02 525/189 |
| 2009/0280280 A1 | * | 11/2009 | Aoki | B32B 27/20 252/511 |
| 2011/0263766 A1 | * | 10/2011 | Eckel | B29C 48/40 524/127 |
| 2013/0158183 A1 | * | 6/2013 | Michels | C08L 69/00 524/504 |
| 2014/0045968 A1 | * | 2/2014 | Kim | C08L 51/06 523/122 |
| 2017/0313870 A1 | * | 11/2017 | Kim | B29C 48/92 |
| 2018/0273749 A1 | * | 9/2018 | Shindo | C08F 212/10 |
| 2020/0180196 A1 | * | 6/2020 | Jung | C25D 5/56 |
| 2021/0139698 A1 | * | 5/2021 | Niessner | C08L 55/02 |

FOREIGN PATENT DOCUMENTS

| | | |
|---|---|---|
| DE | 10208674 A1 | 9/2003 |
| DE | 102007015625 A1 | 10/2008 |
| KR | 10-0643742 A | 7/2006 |
| KR | 10-2019-0081858 A | 7/2019 |
| KR | 10-2020-0051080 A | 5/2020 |
| KR | 10-2020-0069917 A | 6/2020 |
| KR | 10-2020-0069919 A | 6/2020 |

* cited by examiner

*Primary Examiner* — Travis M Figg
(74) *Attorney, Agent, or Firm* — Morgan, Lewis & Bockius LLP

(57) ABSTRACT

A thermoplastic resin composition includes base resin, which includes a polycarbonate resin and an acrylonitrile-butadiene-styrene (ABS) resin, and an additive. The ABS resin includes a rubber-modified vinyl-based graft copolymer resin, an aromatic vinyl-vinyl cyanide-based copolymer resin. The polycarbonate resin has a weight-average molecular weight of 20,000 g/mol to 40,000 g/mol, and the rubber-modified vinyl-based graft copolymer resin comprises 50 wt % to 60 wt % of polybutadiene rubber based on a total wt % of the thermoplastic resin composition.

14 Claims, No Drawings

THERMOPLASTIC RESIN COMPOSITION AND MOLDED PRODUCT PRODUCED USING THE SAME AND HAVING IMPROVED PLATING ADHESION AND LIGHT TRANSMITTANCE

CROSS-REFERENCE TO RELATED APPLICATION

This application claims the benefit of priority to Korean Patent Application No. 10-2020-0141650 filed on Oct. 29, 2020 in the Korean Intellectual Property Office, the entire contents of which are incorporated herein by reference.

TECHNICAL FIELD

The present disclosure provides a thermoplastic resin composition including a polycarbonate resin, a rubber-modified vinyl-based graft copolymer resin, an aromatic vinyl-vinyl cyanide-based copolymer resin and an additive, and a molded product produced using the thermoplastic resin composition and having improved plating adhesion and excellent light transmittance as a result of controlling the content of each component in the composition.

BACKGROUND

In recent years, a lot of parts that give both metallic texture and lightness have been applied to automobile interior and exterior parts for the purpose of improving emotional quality. In particular, the metallic texture may improve merchantability by imparting a unique metallic pattern and gloss in visual terms and imparting unique metallic hardness and cool touch feeling in tactile terms. In addition, it is possible to give consumers visual aesthetics by giving lightness to automobile interior and exterior parts.

Conventional technologies related to metallic texture and lightness for application to automobile interior and exterior parts typically include: printing type partial plating technology that forms a plating layer on an injection-molded material excluding a printed portion after masking printing; laser cutting plating technology that performs electroplating by partially removing a chemical plating layer using a laser after chemical plating; and dry plating technology that partially removes a coating layer by laser cutting after coating and metal deposition.

As is well known, styrene-based resins (ABS resins), each composed of three components (acrylonitrile, butadiene and styrene), or polycarbonate (PC)-based resins (PC resins), are widely used as plastic materials for plating. Conventional ABS resins for plating have excellent plating properties, but are unsuitable for use as materials for automotive lighting parts, because injection-molded materials obtained using the ABS resin have an inherent yellow color and have poor light transmission uniformity. In addition, PC resins for plating, which are widely applied to lighting parts of automobile interior and exterior parts, have excellent optical properties (excellent light transmission uniformity and transmittance control), but have a disadvantage in that it is difficult to achieve plating adhesion between plastic and a plating layer.

A related art, e.g., Korean Patent No. 10-0643742, discloses a thermoplastic resin composition having excellent plating adhesion and impact resistance, and discloses a thermoplastic resin composition having excellent plating properties and obtained using an acrylonitrile-butadiene styrene (ABS) resin consisting of a graft acrylonitrile-butadiene styrene (ABS) copolymer resin having a small particle diameter and a graft acrylonitrile-butadiene styrene (ABS) copolymer resin having a large particle diameter, and a styrene-acrylonitrile (SAN) copolymer resin. However, it does not solve the inherent yellow color problem of the material and does not propose a method for solving the problem that the light transmission uniformity is lowered.

Accordingly, there is a need for a resin composition which may have a reduced yellow color sensation compared to ABS resin when lightness is imparted thereto, and may easily achieve plating adhesion compared to PC resin.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

An object of the present disclosure is to provide a molded product having excellent light transmittance, luminance uniformity and transparency.

Another object of the present disclosure is to provide a molded product having a plating adhesion of 5 N/cm or more for bonding between plastic and a plating layer for plating application.

Still another object of the present disclosure is to provide a molded product that maintains excellent light resistance properties after being exposed to the outside.

Objects of the present disclosure are not limited to the above-mentioned objects. Objects of the present disclosure will become more apparent from the following description, and will be realized by means described in the claims and combinations thereof.

The present disclosure provides a thermoplastic resin composition including: a base resin including a polycarbonate resin and an acrylonitrile-butadiene-styrene (ABS) resin; and an additive, wherein the ABS resin includes a rubber-modified vinyl-based graft copolymer resin and an aromatic vinyl-vinyl cyanide copolymer resin.

The polycarbonate resin may have a weight-average molecular weight of 20,000 g/mol to 40,000 g/mol.

The rubber-modified vinyl-based graft copolymer resin may include 50 wt % to 60 wt % of polybutadiene rubber, based on a total wt % of the thermoplastic resin composition.

The polybutadiene rubber may have an average particle diameter of 200 nm to 400 nm.

The aromatic vinyl-vinyl cyanide copolymer resin may include 60 wt % to 70 wt % of an aromatic vinyl compound component and 30 wt % to 40 wt % of a vinyl cyanide compound component, based on a total wt % of the thermoplastic resin composition.

The aromatic vinyl compound of the aromatic vinyl-vinyl cyanide copolymer resin may include one selected from the group consisting of styrene, α-methylstyrene, p-methylstyrene, and combinations thereof, and the vinyl cyanide compound thereof may include one selected from the group consisting of acrylonitrile, methacrylonitrile, fumaronitrile, and combinations thereof.

The aromatic vinyl-vinyl cyanide copolymer resin may include styrene and acrylonitrile, wherein the weight ratio between the styrene and the acrylonitrile may be 60:40 to 70:30.

The aromatic vinyl-vinyl cyanide copolymer resin may have a weight-average molecular weight of 70,000 g/mol to 300,000 g/mol.

The weight ratio between the polycarbonate resin and the ABS resin may be 5:5 to 6:4.

The base resin may include 55 wt % to 70 wt % of the polycarbonate resin, 24 wt % to 28 wt % of the rubber-modified vinyl-based graft copolymer resin, and 6 wt % to 21 wt % of the aromatic vinyl-vinyl cyanide copolymer resin, based on a total wt % of the thermoplastic resin composition.

The additive may include a UV stabilizer and a pigment.

The UV stabilizer may include any one of a benzotriazole-based compound and a triazine-based compound.

The additive may be included in an amount of 1.5 parts by weight to 3.0 parts by weight based on 100 parts by weight of the base resin.

The present disclosure also provides a molded product composed of the thermoplastic resin composition.

The molded product may have a thickness of 1.0 mm to 3.0 mm.

DETAILED DESCRIPTION

The above objects, other objects, features and advantages of the present disclosure will become apparent with reference to the embodiments described below. However, the present disclosure is not limited to the embodiments disclosed below and may be embodied in a variety of different forms. Rather, these embodiments disclosed herein are provided so that this disclosure will be thorough and complete, and will fully convey the spirit of the present disclosure to those skilled in the art.

In the present specification, it should be understood that terms such as "include" and "have" are intended to denote the existence of characteristics, numbers, steps, operations, components, parts, or combinations thereof that are mentioned in the specification, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists therebetween. Conversely, when a part, such as a layer, film, region, plate, or the like, is referred to as being "below" another part, it not only refers to a case where the part is directly below the other part, but also a case where a third part exists therebetween.

Since all numbers, values and/or expressions referring to quantities of components, reaction conditions, resin compositions, and mixtures used in the present specification are subject to various uncertainties of measurement encountered in obtaining such values, unless otherwise indicated, all are to be understood as modified in all instances by the term "about." Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated.

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to 18%, 20% to 30%, etc., and also include any value between the integers which are reasonable in the context of the range stated, such as 10.5%, 15.5%, 25.5%, etc.

The present disclosure provides a thermoplastic resin composition including a polycarbonate resin, a rubber-modified vinyl-based graft copolymer resin, an aromatic vinyl-vinyl cyanide-based copolymer resin and an additive, and a molded product produced using the thermoplastic resin composition and having improved plating adhesion and excellent light transmittance as a result of controlling the content of each component in the composition.

Hereinafter, the thermoplastic resin composition of the present disclosure and a molded product produced using the same will be described, respectively.

Thermoplastic Resin Composition

The thermoplastic resin composition of the present disclosure includes: a base resin including a polycarbonate resin and an acrylonitrile-butadiene-styrene (ABS) resin including a rubber-modified vinyl-based graft copolymer resin and an aromatic vinyl-vinyl cyanide copolymer resin; and an additive.

Hereinafter, each component of the thermoplastic resin composition of the present disclosure will be described, and a molded product produced using the thermoplastic resin composition will be described.

Base Resin

The base resin of the present disclosure includes a polycarbonate resin and an acrylonitrile-butadiene-styrene (ABS) resin.

In the present disclosure, the weight ratio between the polycarbonate resin and the ABS resin may be 5:5 to 6:4.

The base resin preferably includes 55 wt % to 70 wt % of the polycarbonate resin, 24 wt % to 28 wt % of the rubber-modified vinyl-based graft copolymer resin, and 6 wt % to 21 wt % of the aromatic vinyl-vinyl cyanide copolymer resin.

Polycarbonate Resin

The polycarbonate resin of the present disclosure may have a weight-average molecular weight of 20,000 g/mol to 40,000 g/mol.

ABS Resin

The ABS resin of the present disclosure may include a rubber-modified vinyl-based graft copolymer resin and an aromatic vinyl-vinyl cyanide copolymer resin.

The rubber-modified vinyl-based graft copolymer resin may include 50 wt % to 60 wt % of polybutadiene rubber.

The polybutadiene rubber preferably has an average particle diameter of 200 nm to 400 nm.

The aromatic vinyl-vinyl cyanide copolymer resin of the present disclosure includes 60 wt % to 70 wt % of an aromatic vinyl compound component and 30 wt % to 40 wt % of a vinyl cyanide compound component.

The aromatic vinyl compound of the aromatic vinyl-vinyl cyanide copolymer resin includes one selected from the group consisting of styrene, α-methylstyrene, p-methylstyrene, and combinations thereof, and the vinyl cyanide compound thereof includes one selected from the group consisting of acrylonitrile, methacrylonitrile, fumaronitrile, and combinations thereof.

The aromatic vinyl-vinyl cyanide copolymer resin may include styrene and acrylonitrile, and the weight ratio between the styrene and the acrylonitrile may be 60:40 to 70:30.

The aromatic vinyl-vinyl cyanide copolymer resin may have a weight-average molecular weight of 70,000 g/mol to 300,000 g/mol, preferably 100,000 g/mol to 200,000 g/mol.

Additive

The additive of the present disclosure may include a UV stabilizer and a pigment.

The UV stabilizer may include any one of a benzotriazole-based compound and a triazine-based compound, and may include a benzotriazole-based compound.

The pigment may include carbon black.

The additive is included in an amount of 1.5 parts by weight to 3.0 parts by weight based on 100 parts by weight of the base resin.

Molded Product

The present disclosure provides a molded product produced using the thermoplastic resin composition.

The molded product may have a thickness of 1.0 mm to 3.0 mm.

Hereinafter, the present disclosure will be described in more detail with reference to specific examples. However, these examples serve to illustrate the present disclosure, and the scope of the present disclosure is not limited thereby.

Preparation Example 1

Thermoplastic resin compositions of Examples 1 to 3 and Comparative Examples 1 to 9, which have the contents shown in Tables 1 and 2 below, were prepared.

TABLE 1

|  |  | Example |  |  | Comparative Example |  |  |  |  |  |
|---|---|---|---|---|---|---|---|---|---|---|
|  |  | 1 | 2 | 3 | 1 | 2 | 3 | 4 | 5 | 6 |
| Base resin (100 parts by weight) | (A) (wt %) | 60 | 60 | 60 | 45 | 75 | 100 | — | 60 | 60 |
|  | (B) (wt %) | 25 | 25 | 27 | 25 | 25 | — | 25 | 30 | 15 |
|  | (C) (wt %) | 15 | 15 | 13 | 30 | — | — | 75 | 10 | 25 |
| (D1) (parts by weight) |  | 1.5 | 2.5 | 2.5 | 1.5 | 1.5 | 1.5 | 1.5 | 1.5 | 1.5 |
| (D2) (parts by weight) |  | — | — | — | — | — | — | — | — | — |

(A) Polycarbonate resin (weight-average molecular weight: 33,000 g/mol)
(B) Rubber-modified vinyl-based graft copolymer resin (average particle diameter: 320 nm, polybutadiene rubber content: 58%)
(C) Aromatic vinyl-vinyl cyanide copolymer resin (weight-average molecular weight: 133,000 g/mol, weight ratio between styrene and acrylonitrile: 70:30)
(D1) UV stabilizer (benzotriazole-based compound, Adeka)
(D2) UV stabilizer (Triazine-based compound, Ciba)

TABLE 2

|  |  | Example |  |  | Comparative Example |  |  |
|---|---|---|---|---|---|---|---|
|  |  | 1 | 2 | 3 | 7 | 8 | 9 |
| Base resin (100 parts by weight) | (A) (wt %) | 60 | 60 | 60 | 60 | 60 | 60 |
|  | (B) (wt %) | 25 | 25 | 27 | 25 | 25 | 25 |
|  | (C) (wt %) | 15 | 15 | 13 | 15 | 15 | 15 |
| (D1) (parts by weight) |  | 1.5 | 2.5 | 2.5 | 1.0 | 4.0 | — |
| (D2) (parts by weight) |  | — | — | — | — | — | 2.5 |

Preparation Example 2

Molded products were prepared while the weight ratio between the polycarbonate resin and the ABS resin contained in the base resin was controlled as shown in Table 3 below. Here, the components of the ABS resin used were the same as those in Example 1.

TABLE 3

| Material grade | #1 | #2 | #3 | #4 |
|---|---|---|---|---|
| Weight ratio of PC:ABS | 0:10 | 5:5 | 6:4 | 7:3 |

Preparation Example 3

Molded products were prepared while the weight ratio between the polycarbonate resin and the ABS resin contained in the base resin was set to one value and additives were used as shown in Table 4 below. However, a pigment was added so that a gray color appeared.

TABLE 4

| Material grade | #1 | #2 | #3 | #4 | #5 | #6 | #7 |
|---|---|---|---|---|---|---|---|
| Weight ratio of PC:ABS | 6:4 | 6:4 | 6:4 | 6:4 | 6:4 | 6:4 | 6:4 |
| UV stabilizer (parts by weight*) | — | — | — | 0.5 | 0.5 | 1.0 | 1.5 |
| Pigment (parts by weight*) | — | 0.5 | 1.0 | — | 0.5 | 0.5 | 0.5 |

UV stabilizer—benzotriazole-based compound
Additive (pigment)—including carbon black
Parts by weight*—based on 100 parts by weight of the base resin Test Example 1

For the molded products prepared from the thermoplastic resin compositions prepared in Preparation Example 1 above, the plating adhesion, light transmittance, light resistance and heat deflection temperature of each molded product were measured, and the results of the measurement are shown in Tables 5 and 6 (thickness of each molded product: 1.2 mm).

TABLE 5

| | | Example | | | Comparative Example | | | | | |
|---|---|---|---|---|---|---|---|---|---|---|
| | | 1 | 2 | 3 | 1 | 2 | 3 | 4 | 5 | 6 |
| Base resin (100 parts by weight) | (A) (wt %) | 60 | 60 | 60 | 45 | 75 | 100 | — | 60 | 60 |
| | (B) (wt %) | 25 | 25 | 27 | 25 | 25 | — | 25 | 30 | 15 |
| | (C) (wt %) | 15 | 15 | 13 | 30 | — | — | 75 | 10 | 25 |
| (D1) (parts by weight) | | 1.5 | 2.5 | 2.5 | 1.5 | 1.5 | 1.5 | 1.5 | 1.5 | 1.5 |
| (D2) (parts by weight) | | — | — | — | — | — | — | — | — | — |
| Plating adhesion (N/m) | | 11.8 | 11.8 | 12.0 | 12.1 | Partially unplated | Unplated | 15.2 | 12.5 | 9.3 |
| Light transmittance (%) | | 12.3 | 12.3 | 12.0 | 10.0 | 16.0 | 16.0 | 8.0 | 11.0 | 12.3 |
| Light resistance (ΔE) | | 1.9 | 1.5 | 1.8 | 2.2 | 1.5 | 1.0 | 5.1 | 2.5 | 1.7 |
| Heat deflection temperature (° C.) | | 110 | 108 | 107 | 98 | 116 | 126 | 85 | 108 | 112 |

(A) Polycarbonate resin (weight-average molecular weight: 33,000 g/mol)
(B) Rubber-modified vinyl-based graft copolymer resin (average particle diameter: 320 nm, polybutadiene rubber content: 58%)
(C) Aromatic vinyl-vinyl cyanide copolymer resin (weight-average molecular weight: 133,000 g/mol, weight ratio between styrene and acrylonitrile: 70:30)
(D1) UV stabilizer (benzotriazole-based compound, Adeka)
(D2) UV stabilizer (triazine-based compound, Ciba)
Plating adhesion: measured by peel test (speed: 50 mm/min) according to ASTM 571 section 11
Light transmittance: ASTM D1003 (based on SCI L 60)
Light resistance: ASTM D6695, color difference measurement after irradiation of 84 MJ
Heat deflection temperature: ASTM D648 (specimen size: 127 mm × 12.7 mm × 6.4 mm, load: 0.45 MPa)

TABLE 6

| | | Example | | | Comparative Example | | |
|---|---|---|---|---|---|---|---|
| | | 1 | 2 | 3 | 7 | 8 | 9 |
| Base resin (100 parts by weight) | (A) (wt %) | 60 | 60 | 60 | 60 | 60 | 60 |
| | (B) (wt %) | 25 | 25 | 27 | 25 | 25 | 25 |
| | (C) (wt %) | 15 | 15 | 13 | 15 | 15 | 15 |
| (D1) (parts by weight) | | 1.5 | 2.5 | 2.5 | 1.0 | 4.0 | — |
| (D2) (parts by weight) | | — | — | — | — | — | 2.5 |
| Plating adhesion (N/m) | | 11.8 | 11.8 | 12.0 | 11.8 | 11.8 | 11.8 |
| Transmittance (%) | | 12.3 | 12.3 | 12.0 | 12.3 | 12.3 | 12.3 |
| Light resistance (ΔE) | | 1.9 | 1.5 | 1.8 | 5.2 | 1.2 | 1.9 |
| Heat deflection temperature (° C.) | | 110 | 108 | 107 | 112 | 104 | 104 |

(A) Polycarbonate resin (weight-average molecular weight: 33,000 g/mol)
(B) Rubber-modified vinyl-based graft copolymer resin (average particle diameter: 320 nm, polybutadiene rubber content: 58%)
(C) Aromatic vinyl-vinyl cyanide copolymer resin (weight-average molecular weight: 133,000 g/mol, weight ratio between styrene and acrylonitrile: 70:30)
(D1) UV stabilizer (benzotriazole-based compound, Adeka)
(D2) UV stabilizer (triazine-based compound, Ciba)
Plating adhesion: measured by peel test (speed: 50 mm/min) according to ASTM 571 section 11
Light transmittance: ASTM D1003 (based on SCI L 60)
Light resistance: ASTM D6695, color difference measurement after irradiation of 84 MJ
Heat deflection temperature: ASTM D648 (specimen size: 127 mm × 12.7 mm × 6.4 mm, load: 0.45 MPa)

Referring to the test results, it can be seen through Comparative Examples 2 and 3 that, as the PC content increased, the light transmittance of the material increased, but the issue of unplating occurred. In addition, it can be seen through Comparative Examples 1 and 4 that, as the PC content decreased and the content of the rubber-modified vinyl-based graft copolymer resin or the aromatic vinyl-vinyl cyanide copolymer resin increased, the plating adhesion increased, but the light transmittance decreased. In addition, it can be seen through Comparative Examples 5 and 6 that, as the content of the rubber-modified vinyl-based graft copolymer resin increased, the plating adhesion increased, but the light resistance and the heat resistance decreased, and conversely, as the content of the rubber-modified vinyl-based graft copolymer resin decreased, the plating adhesion decreased. In addition, it can be seen through Comparative Examples 8 and 9 that, as the content of the UV stabilizer increased, the heat resistance decreased, and as the content of the UV stabilizer decreased, the light resistance became very poor.

Test Example 2

For the four molded products prepared in Preparation Example 2 above, the plating adhesion and light resistance of each molded product were evaluated, and the results of the evaluation are shown in Table 7 below (thickness of each molded product: 1.2 mm).

TABLE 7

| Material grade | #1 | #2 | #3 | #4 |
|---|---|---|---|---|
| Weight ratio of PC:ABS | 0:10 | 5:5 | 6:4 | 7:3 |
| Plating property | Good appearance | Good appearance | Good appearance | Unsatisfactory appearance (unplated) |
| Plating adhesion (N/m) | 15.2 | 11.3 | 11.8 | — |
| Light resistance (E) | 22.5 | 18.2 | 13.2 | 7.5 |

Referring to the evaluation results in Table 7 above, it can be seen that, as the content of the PC resin increased, the plating adhesion decreased, and when the content of the PC resin exceeded the content of the ABS resin (that is, more than 5:5), the plating adhesion decreased and the unplating phenomenon occurred. In addition, it can be seen that, as the content of the PC resin increased, the light resistance became better.

Test Example 3

For the seven molded products prepared in Preparation Example 3 above, the plating adhesion and light resistance of each molded product were evaluated, and the results of the evaluation are shown in Table 8 below (thickness of each molded product: 1.2 mm).

TABLE 8

| Material grade | #1 | #2 | #3 | #4 | #5 | #6 | #7 |
|---|---|---|---|---|---|---|---|
| Weight ratio of PC:ABS (100 parts by weight) | 6:4 | 6:4 | 6:4 | 6:4 | 6:4 | 6:4 | 6:4 |
| UV stabilizer (parts by weight) | — | — | — | 0.5 | 0.5 | 1.0 | 1.5 |
| Pigment (parts by weight) | — | 0.5 | 1.0 | — | 0.5 | 0.5 | 0.5 |
| Plating property | Good appearance | Good appearance | Good appearance | Good appearance | Good appearance | Good appearance | Good appearance |
| Plating adhesion (N/cm) | 11.5 | 11.3 | 11.5 | 11.5 | 11.4 | 11.8 | 9.7 |
| Light resistance (E) | 15.8 | 13.2 | 12.1 | 9.1 | 8.2 | 5.2 | 1.9 |

UV stabilizer—benzotriazole-based compound
Pigment—including carbon black

Referring to the results in Table 8 above, it can be seen that, when the weight ratio between the PC resin and the ABS resin was 6:4 and when 1.5 parts by weight of the ultraviolet stabilizer and 0.5 parts by weight of the pigment were used, the evaluation result of the light resistance was the best. In addition, in this case, the plating adhesion was also good.

As described above, according to the present disclosure, it is possible to provide a molded product having excellent light transmittance, luminance uniformity and transparency.

According to the present disclosure, it is possible to provide a molded product having a plating adhesion of 5 N/cm or more for bonding between plastic and a plating layer for plating application.

According to the present disclosure, it is possible to provide a molded product that maintains excellent light resistance properties after being exposed to the outside.

The effects of the present disclosure are not limited to the above-mentioned effects. It is to be understood that the effects of the present disclosure include all effects that may be deduced from the above description.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A thermoplastic resin composition comprising:
    a base resin comprising a polycarbonate resin and an acrylonitrile-butadiene-styrene (ABS) resin; and
    an additive,
    wherein the ABS resin comprises:
        a rubber-modified vinyl-based graft copolymer resin; and
        an aromatic vinyl-vinyl cyanide copolymer resin, and
    wherein the base resin comprises 58 wt % to 60 wt % of the polycarbonate resin, 25 wt % to 27 wt % of the rubber-modified vinyl-based graft copolymer resin, and 13 wt % to 15 wt % of the aromatic vinyl-vinyl cyanide copolymer resin, based on a total wt % of the base resin.

2. The thermoplastic resin composition of claim 1, wherein the polycarbonate resin has a weight-average molecular weight of 20,000 g/mol to 40,000 g/mol.

3. The thermoplastic resin composition of claim 1, wherein the rubber-modified vinyl-based graft copolymer resin comprises 50 wt % to 60 wt % of polybutadiene rubber based on a total wt % of the rubber-modified vinyl-based graft copolymer resin.

4. The thermoplastic resin composition of claim 3, wherein the polybutadiene rubber has an average particle diameter of 200 nm to 400 nm.

5. The thermoplastic resin composition of claim 1, wherein the aromatic vinyl-vinyl cyanide copolymer resin comprises, based on a total wt % of the aromatic vinyl-vinyl cyanide copolymer resin, 60 wt % to 70 wt % of an aromatic vinyl compound component and 30 wt % to 40 wt % of a vinyl cyanide compound component.

6. The thermoplastic resin composition of claim 1, wherein the aromatic vinyl compound of the aromatic vinyl-vinyl cyanide copolymer resin comprises one selected from the group consisting of styrene, α-methylstyrene, p-methylstyrene, and combinations thereof, and the vinyl cyanide compound thereof comprises one selected from the group consisting of acrylonitrile, methacrylonitrile, fumaronitrile, and combinations thereof.

7. The thermoplastic resin composition of claim 1, wherein the aromatic vinyl-vinyl cyanide copolymer resin comprises styrene and acrylonitrile, and a weight ratio between the styrene and the acrylonitrile is 60:40 to 70:30.

8. The thermoplastic resin composition of claim 1, wherein the aromatic vinyl-vinyl cyanide copolymer resin has a weight-average molecular weight of 70,000 g/mol to 300,000 g/mol.

9. The thermoplastic resin composition of claim 1, wherein a weight ratio between the polycarbonate resin and the ABS resin is 5:5 to 6:4.

10. The thermoplastic resin composition of claim 1, wherein the additive comprises a Ultraviolet (UV) stabilizer and a pigment.

11. The thermoplastic resin composition of claim 10, wherein the UV stabilizer comprises any one of a benzotriazole-based compound and a triazine-based compound.

12. The thermoplastic resin composition of claim 1, wherein the additive is present in an amount of 1.5 parts by weight to 3.0 parts by weight based on 100 parts by weight of the base resin.

13. A molded product composed of the thermoplastic resin composition according to claim 1.

14. The molded product of claim 13, having a thickness of 1.0 mm to 3.0 mm.

* * * * *